(12) United States Patent
Ikuta et al.

(10) Patent No.: US 8,733,791 B2
(45) Date of Patent: May 27, 2014

(54) COLLISION SENSING DEVICE AND OCCUPANT PROTECTING SYSTEM

(75) Inventors: Naoki Ikuta, Susono (JP); Shunichi Katsumata, Susono (JP); Motomi Iyoda, Seto (JP); Yusuke Mase, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/695,764

(22) PCT Filed: Feb. 10, 2011

(86) PCT No.: PCT/JP2011/052931
§ 371 (c)(1),
(2), (4) Date: Sep. 11, 2013

(87) PCT Pub. No.: WO2012/108051
PCT Pub. Date: Aug. 16, 2012

(65) Prior Publication Data
US 2014/0001738 A1    Jan. 2, 2014

(51) Int. Cl.
*B60R 21/0136*   (2006.01)

(52) U.S. Cl.
USPC .............. 280/735; 180/282; 180/274; 701/45; 340/436

(58) Field of Classification Search
USPC ........ 280/735; 180/274, 282; 340/436, 425.5; 701/45
See application file for complete search history.

(56) References Cited

U.S. PATENT DOCUMENTS

| | | | |
|---|---|---|---|
| 5,547,216 A | 8/1996 | Iwata et al. | |
| 5,670,718 A | 9/1997 | Nagahara | |
| 5,748,075 A * | 5/1998 | Dirmeyer et al. | 340/436 |
| 7,295,909 B2 * | 11/2007 | Recknagel | 701/45 |
| 7,484,756 B2 * | 2/2009 | Le et al. | 280/735 |
| 7,556,119 B2 * | 7/2009 | Takehara et al. | 180/274 |
| 7,711,467 B2 * | 5/2010 | Nonaka et al. | 701/45 |
| 8,428,862 B2 * | 4/2013 | Mase et al. | 701/301 |
| 2002/0147533 A1 * | 10/2002 | Foo et al. | 701/45 |
| 2003/0127270 A1 | 7/2003 | Mattes et al. | |
| 2006/0124378 A1 | 6/2006 | Recknagel | |
| 2006/0237255 A1 * | 10/2006 | Wanami et al. | 180/274 |
| 2006/0276965 A1 | 12/2006 | Ide | |
| 2007/0114771 A1 * | 5/2007 | Wanami et al. | 280/735 |
| 2010/0179731 A1 * | 7/2010 | Le et al. | 701/47 |

FOREIGN PATENT DOCUMENTS

| | | |
|---|---|---|
| JP | A-5-139244 | 6/1993 |
| JP | A-5-238350 | 9/1993 |
| JP | A-6-99787 | 4/1994 |
| JP | A-6-115406 | 4/1994 |
| JP | A-7-242153 | 9/1995 |
| JP | A-8-113108 | 5/1996 |
| JP | A-8-324379 | 12/1996 |

(Continued)

*Primary Examiner* — Drew Brown
(74) *Attorney, Agent, or Firm* — Oliff PLC

(57) ABSTRACT

A pressure sensor, which detects a pressure in a space close to an inner side of an exterior member of a vehicle, and an occupant protecting device, which protects an occupant inside a vehicle are provided. An electronic control unit determines an occurrence of collision in the case where the pressure and a change per unit time of the pressure each satisfy a collision condition, and then makes the occupant protecting device operate. At this time, the collision condition is set to restrict the determination indicative of an occurrence of collision unless the change per unit time of the pressure is larger with lowering the pressure.

12 Claims, 13 Drawing Sheets

(56) References Cited

FOREIGN PATENT DOCUMENTS

| JP | A-8-332915 | 12/1996 |
| JP | A-9-58402 | 3/1997 |
| JP | A-11-310095 | 11/1999 |
| JP | A-2004-513824 | 5/2004 |
| JP | A-2005-515466 | 5/2005 |
| JP | A-2005-538893 | 12/2005 |
| JP | A-2006-337259 | 12/2006 |
| JP | A-2009-12614 | 1/2009 |
| WO | WO 02/40321 A1 | 5/2002 |
| WO | WO 03/062780 A1 | 7/2003 |

* cited by examiner

FIG.4
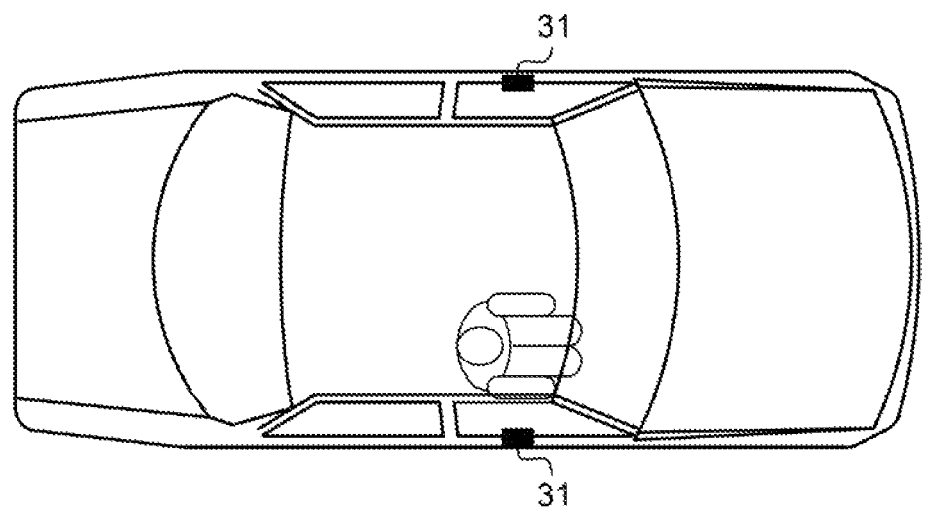
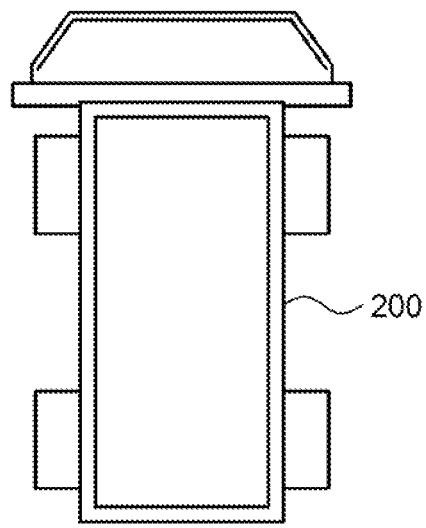

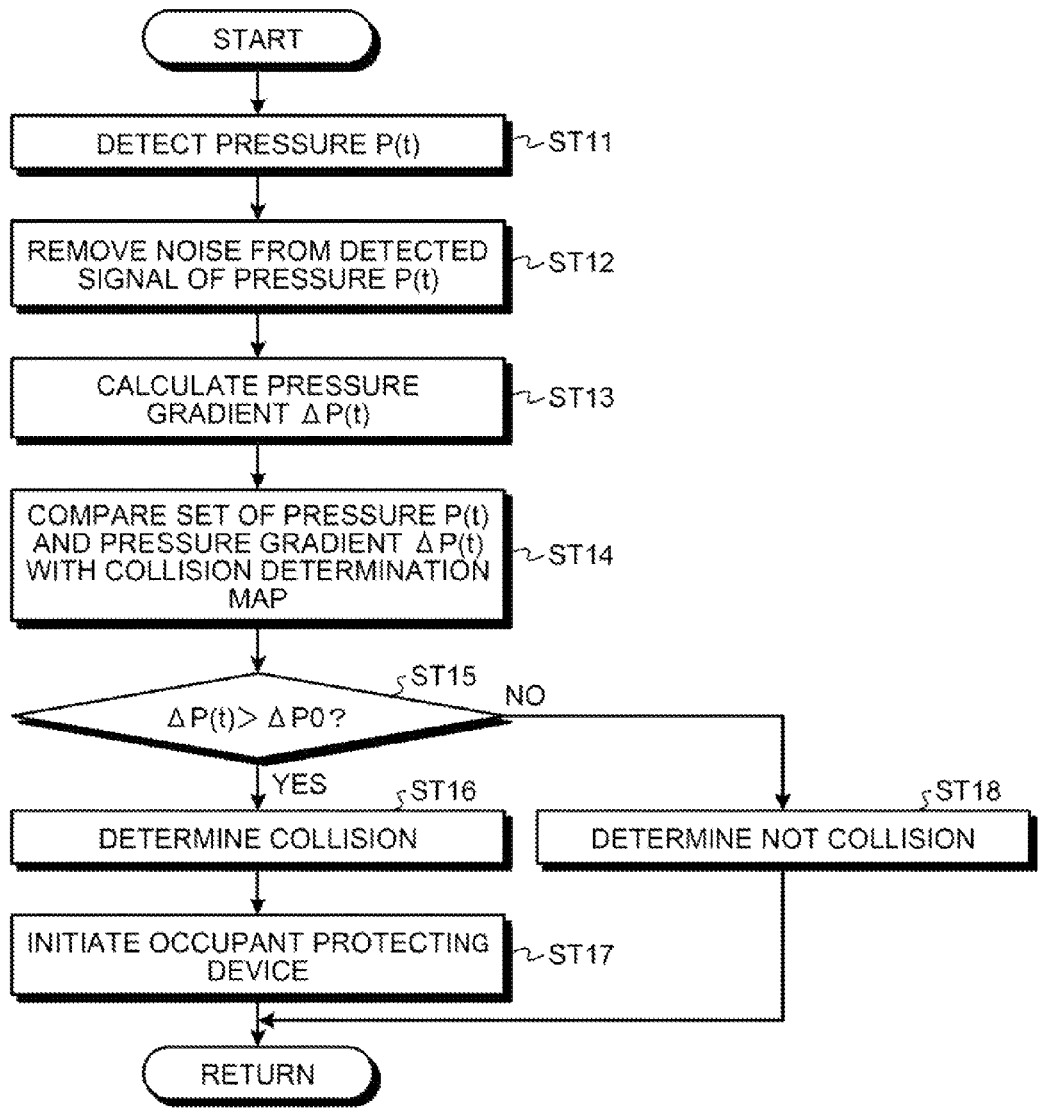

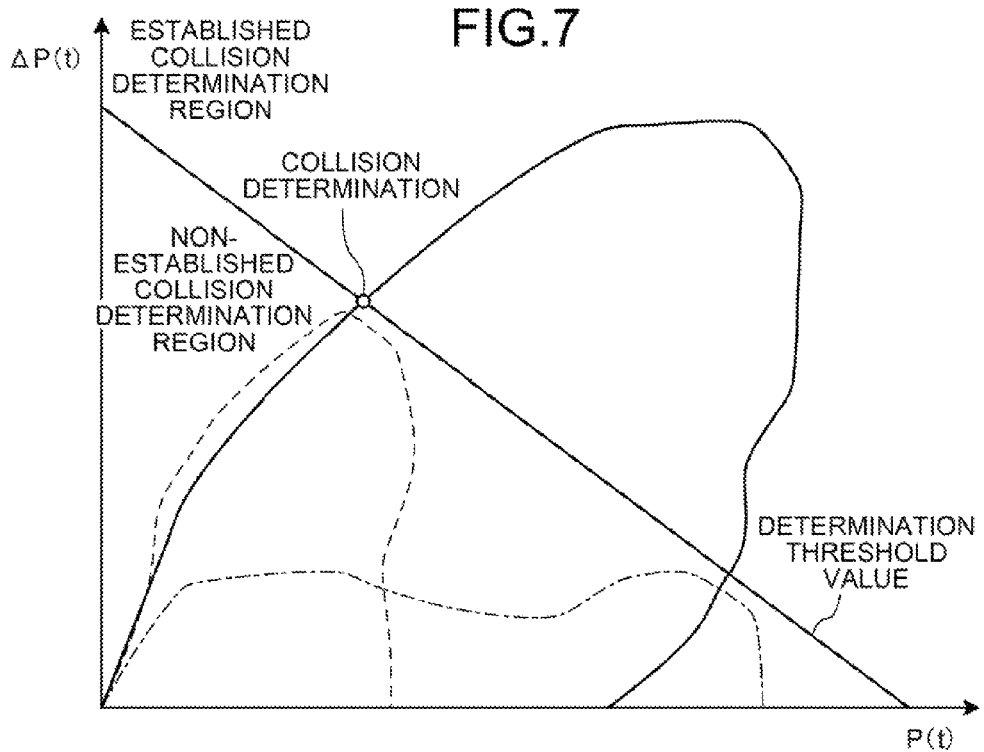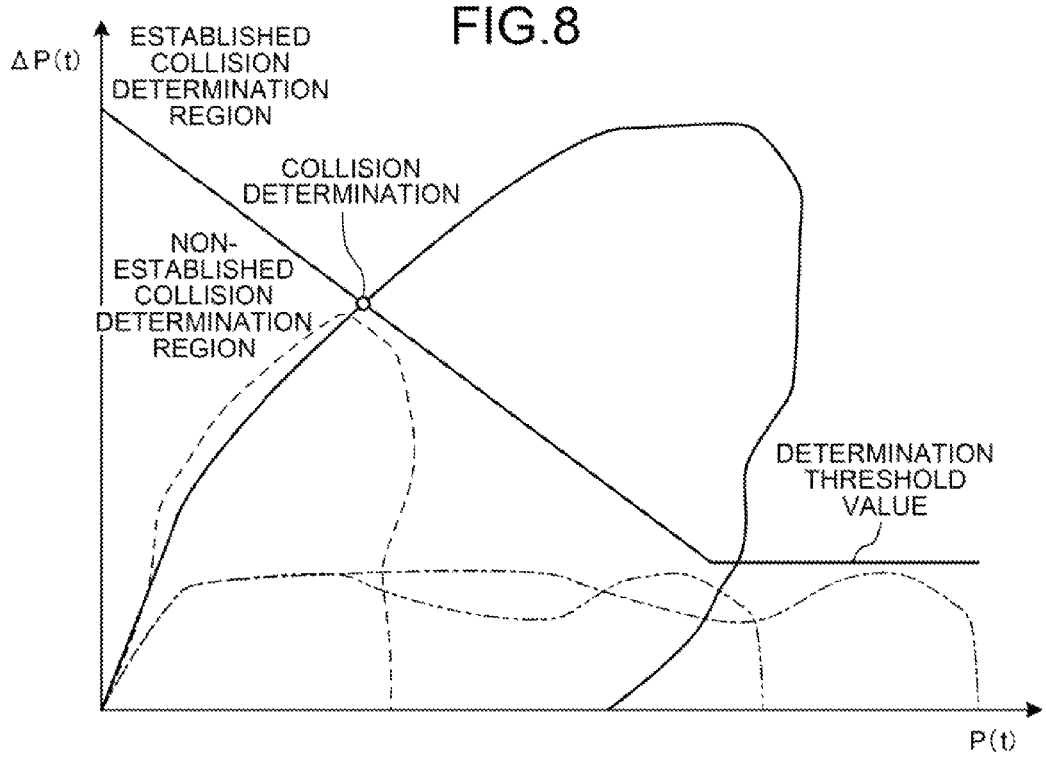

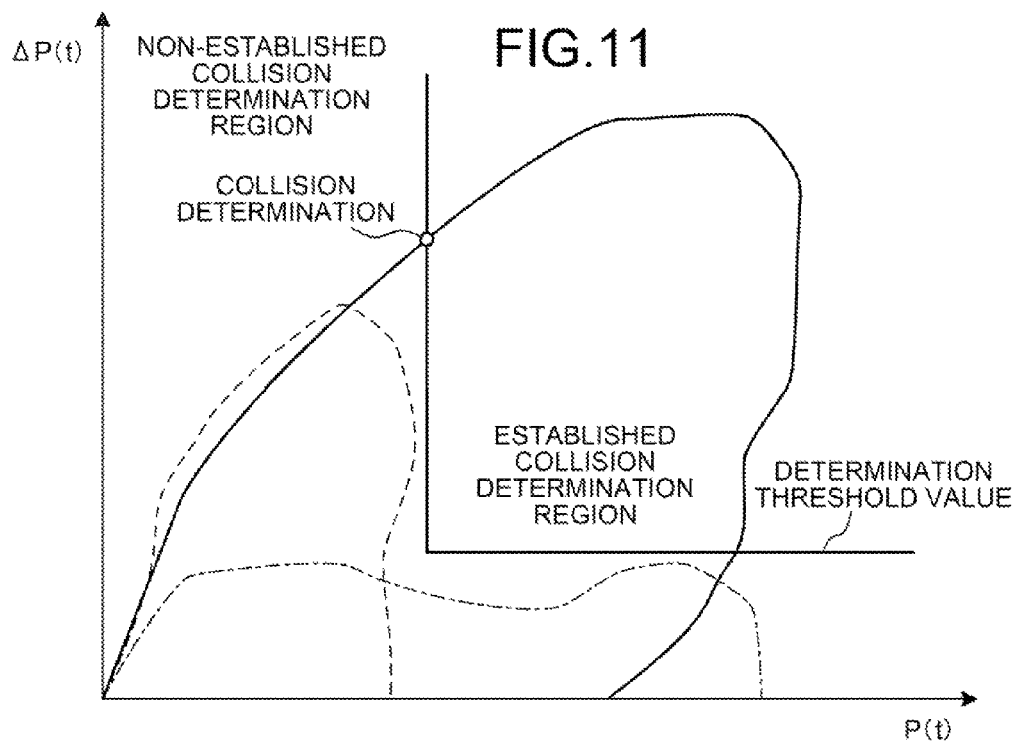
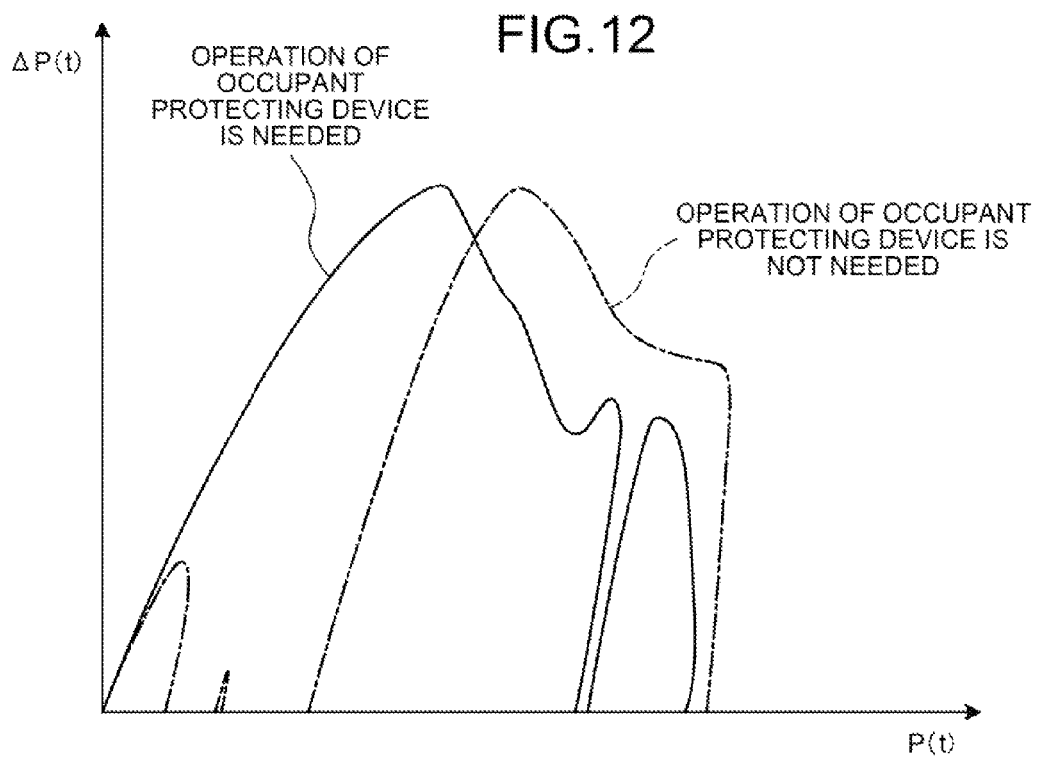

COLLISION SENSING DEVICE AND OCCUPANT PROTECTING SYSTEM

FIELD

The present invention relates to a collision sensing device and an occupant protecting system that protect an occupant in a vehicle.

BACKGROUND

A conventional vehicle includes an occupant protecting system. The occupant protecting system includes a collision sensing device, which senses a vehicle collision, and an occupant protecting device, which protects the occupant in a cabin at the time of the vehicle collision. A known occupant protecting device includes a so-called airbag that deploys at collision. For example, Patent Literature 1 discloses a collision sensing device that detects air pressure of a space in a side door using an air pressure sensor. In the case where the collision sensing device detects sudden rise of the air pressure, the collision sensing device determines a side collision and deploys an airbag. A technique disclosed in Patent Literature 2 includes an air tank and a pressure sensor, which detects an internal pressure of the air tank, in a vehicle door. While a rising speed of the internal pressure is approximately proportional to a crushing speed of a vehicle-door outer panel, the maximum value of the internal pressure is approximately proportional to an amount of crush of the vehicle-door outer panel. In view of this, the technique measures a temporal change of an output signal from the pressure sensor so as to detect the rising speed of the internal pressure and the maximum value of the internal pressure. The technique consequently deploys an airbag when the rising speed and the maximum value exceed the respective threshold values.

A technique disclosed in Patent Literature 3 calculates a mass of a collision object based on a pressure on a bumper and a vehicle speed. Then, the technique corrects the mass based on the pressure and a temporal change of the pressure. The technique in turn determines whether or not the collision object is a pedestrian based on the corrected mass.

CITATION LIST

Patent Literature

Patent Literature 1: Japanese Patent Application Laid-open No. H08-324379
Patent Literature 2: Japanese Patent Application Laid-open No. H07-242153
Patent Literature 3: Japanese Patent Application Laid-open No. 2009-012614

SUMMARY

Technical Problem

The vehicle collision includes the following cases. For example, in the case where the vehicle door is hit with a bat or a ball, a local deformation occurs and has an increased deformation speed. In thin case, it is not preferred that the hit be determined as a collision since there is a little need to deploy the airbag. In this case, while a pressure at a space in the vehicle door is low, a change per unit time of the pressure is large. This consequently causes a possibility of the airbag deploying. Alternatively, for example, in the case where a bicycle or a pedestrian hits, this causes a large contacted area (that is, deformation becomes large) and has a low deformation speed. In this case, there is also little need to deploy the airbag. Thus, it is not preferred that the hit be determined as a collision. In this case, while the change per unit time of the pressure at the space in the vehicle door is small, the pressure itself is large. Thus, the airbag may possibly deploy. Therefore, in a conventional technique, incorrect determination may possibly be made even in the case where it is not preferred that the determination result be a collision.

An object of the present invention is to provide a collision sensing device and an occupant protecting system that address the problem of the conventional technique, thus improving accuracy of determination of a collision.

Solution to Problem

In order to achieve the above mentioned object, a collision sensing device according to the present invention includes a pressure sensor configured to detect a pressure in a space, the space being disposed close to an inner side of an exterior member of a vehicle, wherein the collision sensing device determines an occurrence of collision in a case where the pressure and a change per unit time of the pressure each satisfy a collision condition.

In order to achieve the above mentioned object, an occupant protecting system according to the present invention includes a pressure sensor configured to detect a pressure in a space, the space being disposed close to an inner side of an exterior member of a vehicle; and an occupant protecting device configured to protect an occupant inside a cabin, wherein the occupant protecting system determines an occurrence of collision in a case where the pressure and a change per unit time of the pressure each satisfy a collision condition, so as to make the occupant protecting device operate.

Here, it is desirable that the collision condition is set to restrict the determination indicative of the occurrence of collision unless the change per unit time of the pressure is larger with lowering the pressure.

In addition, it is desirable to further include an acceleration sensor configured to detect an acceleration of a vehicle body, the occupant protecting system desirably determines a final determination indicative of an actual occurrence of collision in a case where a determination indicative of an occurrence of collision is made based on the pressure and the change per unit time of the pressure, and a determination indicative of an occurrence of collision is made based on the acceleration, so as to make the occupant protecting device operate.

Further, in order to achieve the above mentioned object, an occupant protecting system according to the present invention includes a pressure sensor configured to detect a pressure in a space, the space being disposed close to an inner side of an exterior member of a vehicle; and an occupant protecting device configured to protect an occupant inside a cabin, wherein the occupant protecting system makes the occupant protecting device operate in a case where the pressure and a change per unit time of the pressure each satisfy a collision condition.

Here, it is desirable that the occupant protecting system restricts the occupant protecting device from operating unless the change per unit time of the pressure is larger with lowering the pressure.

In addition, it is desirable to further include an acceleration sensor configured to detect an acceleration of a vehicle body, the occupant protecting system desirably makes the occupant protecting device operate in a case where the pressure and the change per unit time of the pressure each satisfy a collision condition for pressure, and the acceleration satisfies a collision condition for acceleration.

Here, it is desirable that the pressure is a denoised signal after detecting with the pressure sensor.

Advantageous Effects of Invention

The collision sensing device according to the present invention makes collision determination based on the pressure of the space and the change per unit time of the pressure. The space (for example, a space next to the collided portion) is close to an inner side of the vehicle exterior member. Accordingly, the collision sensing device determines that a collision occurs if the pressure and the change per unit time of the pressure each have the size indicative of a collision that needs the operation of the occupant protecting device. In contrast, in the case where one of the pressure and the change per unit time of the pressure has the value to be determined as a collision, and the collision sensing device may determine that the other is not determined as a collision, the collision sensing device does not determine that the collision that needs the operation of the occupant protecting device has occurred. Further, the occupant protecting system according to the present invention operates the occupant protecting device in the case where the pressure and the change per unit time of the pressure each have the dimension indicative of a collision that needs the operation of the occupant protecting device. On the other hand, the occupant protecting system does not operate the occupant protecting device in the case where one of the pressure and the change per unit time of the pressure does not have the dimension indicative of a collision that needs the operation of the occupant protecting device. Here, in the case where the information of the pressure is used alone, the occupant protecting system is not able to determine whether to operate the occupant protecting device until the maximum value is measured. However, the collision sensing device and the occupant protecting system according to the present invention also use the information of the change per unit time of the pressure. The collision sensing device and the occupant protecting system accurately and promptly determines whether to operate the occupant protecting device, compared with the case where the information of the pressure is used alone. That is, the collision sensing device according to the present invention accurately and promptly provides the determination result of the collision determination. The occupant protecting system according to the present invention accurately and promptly operates the occupant protecting device.

BRIEF DESCRIPTION OF DRAWINGS

FIG. 4 is an explanatory diagram of a side-impact test.

FIG. 6 is a flowchart illustrating whole operations of the collision sensing device and the occupant protecting system according to the present invention.

FIG. 7 is a graph illustrating an exemplary collision determination map.

FIG. 8 is a graph illustrating another exemplary collision determination map.

FIG. 11 is a graph illustrating another exemplary collision determination map.

FIG. 12 is a graph illustrating a case where a waveform that needs an operation of an occupant protecting device is similar to a waveform that does not need the operation of the occupant protecting device.

DESCRIPTION OF EMBODIMENTS

Embodiments of a collision sensing device and an occupant protecting system according to the present invention will be described in detail below based on the accompanying drawings. The present invention is not limited to the embodiments.

Embodiment

Embodiments of a collision sensing device and an occupant protecting system according to the present invention, will be described based on FIGS. 1 to 13.

Figure 1:
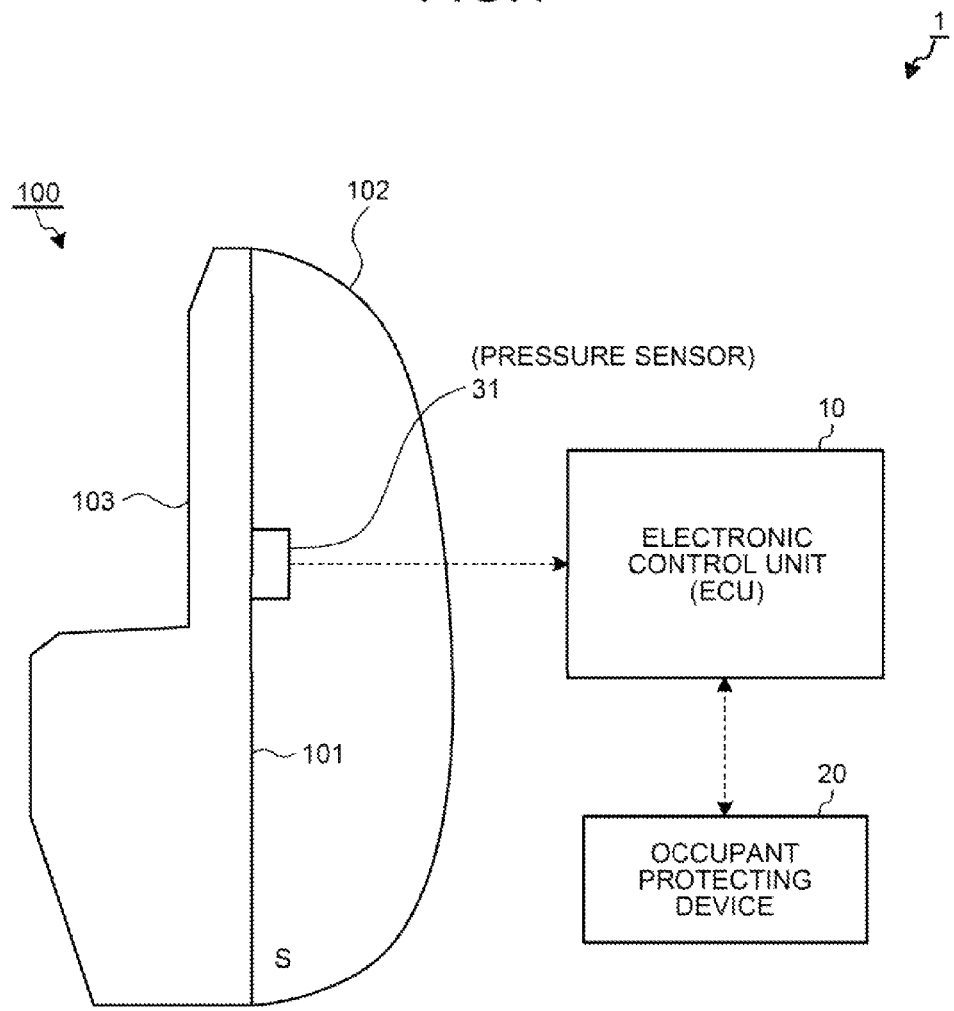
FIG. 1 is a schematic diagram illustrating exemplary configurations of a collision sensing device and an occupant protecting system according to the present invention.

A reference numeral 1 in FIG. 1 denotes an occupant protecting system of this embodiment. The occupant protecting system 1 operates with an electronic control unit (ECU) 10, and includes an occupant protecting device 20, which protects an occupant inside a cabin when a vehicle collides. The occupant protecting device 20 includes a so-called airbag that deploys at a collision so as to protect the occupant.

Here, the occupant protecting device 20 is made to operate by the electronic control unit 10 triggered by sensing of a vehicle collision. Accordingly, the occupant protecting system 1 includes a collision sensing device that senses a vehicle collision. In this example, the electronic control unit 10 has an arithmetic processing function of the collision sensing device. The collision sensing device will be described in detail below.

The collision sensing device makes a determination of a collision that needs an operation of the occupant protecting device 20. The determination is based on a pressure P(t) of a space close to an inner side of a vehicle exterior member, and based on a pressure change ΔP(t) (hereinafter referred to as "a pressure gradient") of the pressure P(t) per unit time. The space is disposed in at least one position of a side face, a front face, and a rear face of the vehicle body, accordingly, the exterior member means an outer panel or a cowl of a vehicle, for example, a door panel or front and rear bumpers. Here, "close to" means a state where the space exists just near the inner side of the exterior member. Specifically, this means as follows. The space exists at least in the vehicle inner side relative to the exterior member, and in the vehicle outer side relative to a member (such as a door trim and a dash panel) that constitutes a passenger compartment (which is called a cabin). Therefore, the space includes a member (such as a door outer panel and a door inner panel) that constitutes the door and a member (such as a bumper absorber and a bumper reinforcement) that constitutes the bumper. For example, it is preferred that the space be arranged in a collided portion that causes an operation of the occupant protecting device 20, a portion next to the collided portion, or a portion adjacent to the collided portion. The space is a space where an inner pressure varies when an external force such as an impact is applied or a rapid change in air pressure occurs outside. The space includes not only an enclosed space that is highly airtight, but also a space that includes a gap, an opening, or the like while being sealed such that the inner pressure even instantaneously varies when, for example, an external force is applied.

Figure 2:
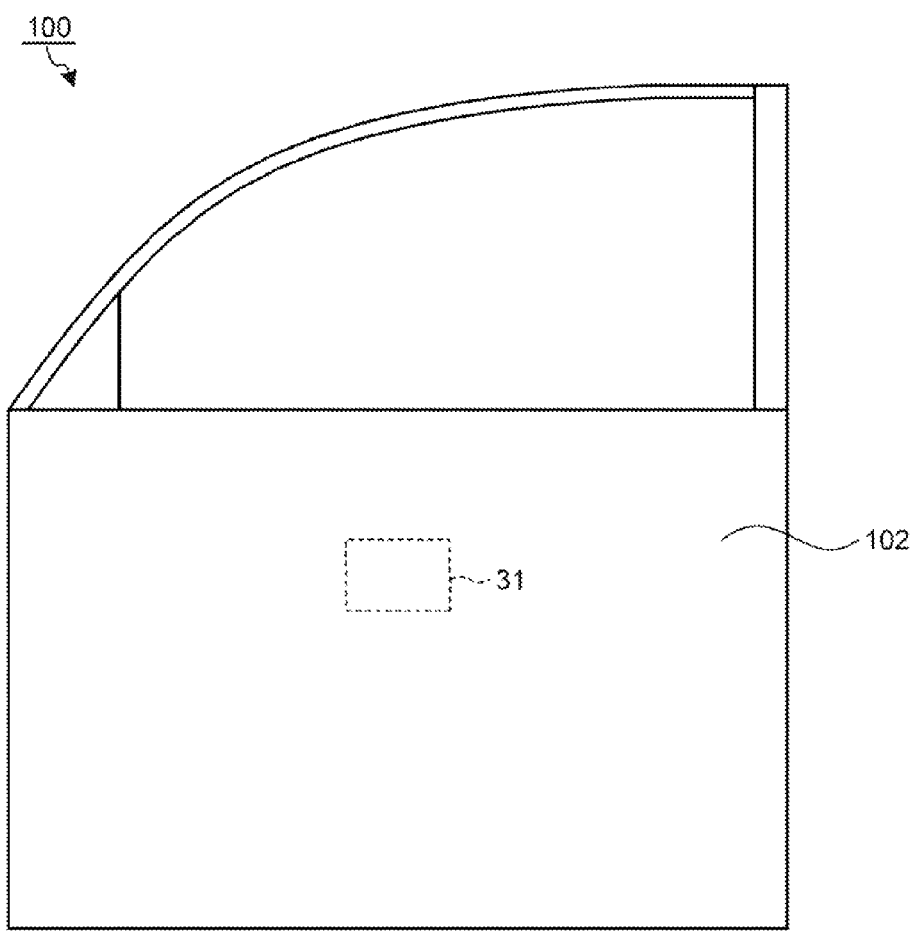
FIG. 2 is an explanatory diagram of a location of a pressure sensor.

Here, the collision sensing device will be described with an exemplary sensing of a side face collision (hereinafter referred to as "side collision"). A door 100 at a side of the vehicle includes an inner panel 101 that is covered with an outer panel 102, which constitutes an outside panel. The door 100 includes a space S that is formed of the inner panel 101 and the outer panel 102 as described above. The door 100 includes a pressure sensor 31 that detects a pressure P(t) in the space S (FIGS. 1 and 2). In this example, the pressure sensor 31 is mounted at the outer panel 102 side of the inner panel 101, that is, in the space S. However, the pressure sensor 31 may have a main body at a door trim 103 side of the inner panel 101 insofar as a detector is disposed in the space S. One vehicle includes the right and left doors 100 that each has at least one pressure sensor 31. In the case where a plurality of doors 100 are disposed on the sides of the vehicle, the respective doors 100 may include the pressure sensors 31.

When an applied force makes a dent in the outer panel 102, the pressure P(t) increases with decreasing volume of the space S. Thus, in the case where the pressure P(t) in the space S increases to equal to or more than a predetermined threshold value, it is estimated that the side collision that needs the operation of the occupant protecting device 20 has occurred. However, in the case where a bicycle or a pedestrian hit the outer panel 102, a pressure P(t) in the space S may exceed a predetermined threshold value for determining that a side collision has occurred. In this case, the operation of the occupant protecting device 20 is not needed. That is, obtaining the pressure P(t) in the space S alone is not able to eliminate possibility of incorrect determination.

Figure 3:
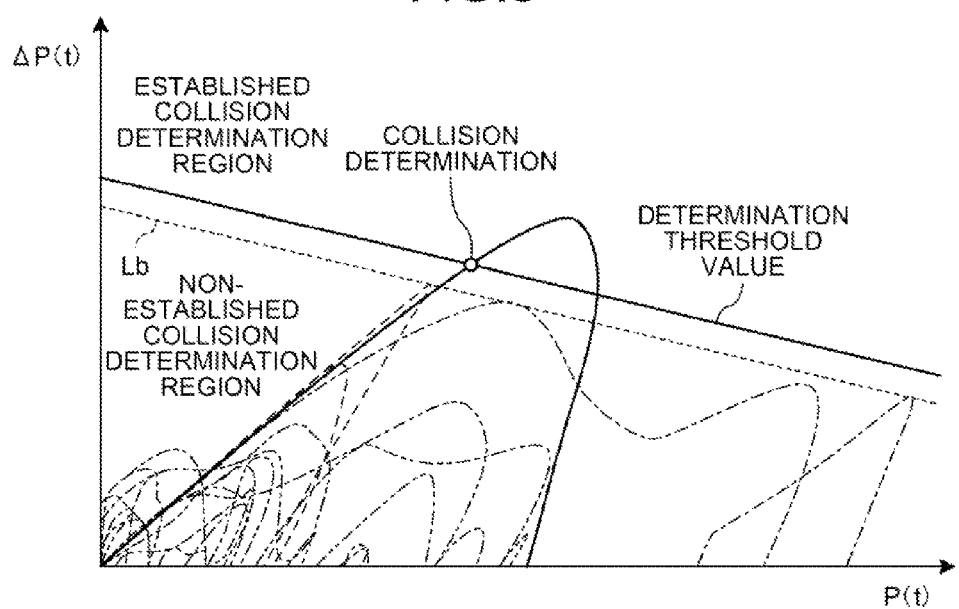
FIG. 3 is a graph illustrating a collision determination map and data collected when the collision determination map is generated.

Here, a pressure P(t) and a pressure gradient ΔP(t) in the space S that are generated when an impact force that does not need the operation of the occupant protecting device 20 is applied to the door 100 will be compared with a pressure P(t) and a pressure gradient ΔP(t) in the space S that are generated when an impact force that needs the operation of the occupant protecting device 20 is applied to the door 100 (see FIG. 3).

In FIG. 3, curved lines such as a alternate long and short dashed line, a alternate long and two short dashes line, and a dashed line show examples in the case where the impact force that does not need the operation of the occupant protecting device 20 is applied to the door 100, that is, in the case where it is not determined that the impact force is a collision. The curved lines such as the alternate long and short dashed line and the alternate long and two short dashes line indicates a case where, for example, a bicycle and a pedestrian hit the door 100, that is, a case where a contacted area where the impact force is applied has a large area (deformation is large) and has a low deformation rate. Accordingly, this example illustrates the following case. While the pressure P(t) in the space S becomes high, the pressure gradient ΔP(t) in the space S becomes low. The curved lines may be obtained in a reliability test based on the example. The curved line illustrated by the dashed line indicates a case where the door 100 is hit with a bat or a ball, that is, a case where a local deformation is generated and a deformation rate is high. Accordingly, this example illustrates the following case. While the pressure gradient ΔP(t) in the space S becomes high, the pressure P(t) in the space S becomes low. The curved line may be obtained in a reliability test based on the example.

In contrast, the curved line illustrated by the solid line in FIG. 3 has a part where the pressure gradient ΔP(t) in the space S versus a pressure P(t) in the space S is higher than those illustrated by the curved lines of the alternate long and short dashed line and the alternate long and two short dashes line. The curved line illustrated by the solid line has a part where a pressure P(t) in the space S versus the pressure gradient ΔP(t) in the space S is higher than that illustrated by the curved line of the dashed line. The curved line illustrated by the solid line is an example of a case where an impact force that needs the operation of the occupant protecting device 20 is applied to the door 100, that is, a case where it is to be determined that a collision has occurred. The curved line is obtained with a test result of a side-impact test with a truck 200 in FIG. 4. The side-impact test is preferred to employ test conditions (such as collision speed of the truck 200) equivalent to that in a side-impact test specified in the regulation.

Here, a region including the curved lines illustrated by the alternate long and short dashed line, the alternate long and two short dashes line, and dashed line is assumed to be a region (hereinafter referred to as "a non-established collision determination region") where the determination result is not a collision. In contrast, a region other than the non-established collision determination region is assumed to be a region (hereinafter referred to as "an established collision determination region") where the determination result is a collision. The established collision determination region is a region where a pressure gradient ΔP(t) is higher than that in the non-established collision determination region at the same pressure P(t). The collision sensing device generates a collision determination map including the established collision determination region and the non-established collision determination region.

Figure 5:
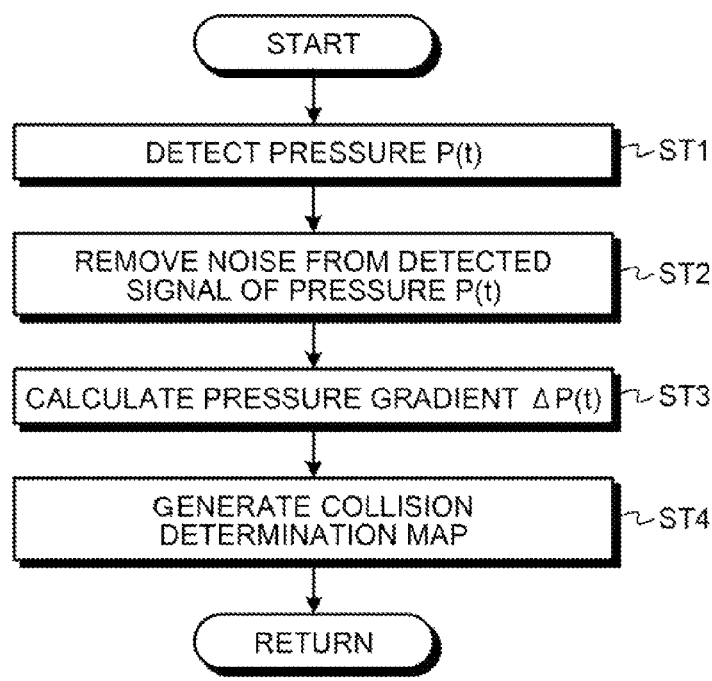
FIG. 5 is a flowchart illustrating a process for generating the collision determination map.

The electronic control unit 10 operates in the side-impact test and the reliability test as illustrated in a flowchart of FIG. 5. The electronic control unit 10 detects a pressure P(t) in the space S with the pressure sensor 31 (step ST1), and removes noise from a detection signal of the pressure P(t) (step ST2). In step ST2, for example, filter processing using, for example, a lowpass filter is executed. The electronic control unit 10 calculates a pressure gradient ΔP(t) in the space S based on the pressure P(t) after the noise removal (step ST3).

The electronic control unit 10 obtains a test result where the pressure P(t) after the noise removal and the pressure gradient ΔP(t) are plotted as illustrated in FIG. 3. Accordingly, the electronic control unit 10 generates a collision determination map based on the test result (step ST4). For example, a boundary line Lb between the established collision determination region and the non-established collision determination region is defined. A determination threshold value is determined based on the boundary line Lb. The boundary line Lb is assumed to be, for example, a tangent line that passes through maximum values, which is obtained in the reliability test, of the respective curved line. The determination threshold value may be on the boundary line Lb or a line that is shifted parallel to the boundary line Lb in the expanding direction of the non-established collision determination region. The example in FIG. 3 determines the latter determination threshold value. The determination threshold values including the respective components of the pressure $P(t)$ and the pressure gradient $\Delta P(t)$ forms a line that separates the established collision determination region and the non-established collision determination region. With lowering the pressure $P(t)$, a determination of an occurrence of the collision that needs the operation of the occupant protecting device 20 is restricted unless the pressure gradient $\Delta P(t)$ is larger. The determination map, thus generated, is preliminary prepared for the vehicle.

Assume that an impact force is applied to the door 100. In the case where at least a part of a curved line including a set of a pressure $P(t)$ and a pressure gradient $\Delta P(t)$, which are detected and calculated, in the space S is plotted in the established collision determination region, the collision sensing device determines that an occurrence of a side collision that needs the operation of the occupant protecting device 20. In other words, the pressure gradient component $\Delta P0$ of the determination threshold value corresponding to the detected the pressure $P(t)$ is compared with the calculated pressure gradient $\Delta P(t)$. Then, in the case where this comparison result indicates that the pressure gradient $\Delta P(t)$ is larger than the pressure gradient component $\Delta P0$, the collision sensing device determines that the side collision that needs the operation of the occupant protecting device 20 has occurred. In contrast, assume that an impact force is applied to the door 100. In the case where the curved line including the set of the pressure $P(t)$ and the pressure gradient $\Delta P(t)$, which are detected and calculated, in the space S is not plotted in the established collision determination region, the collision sensing device determines that a side collision that needs the operation of the occupant protecting device 20 has not occurred. In other words, the pressure gradient component $\Delta P0$ of the determination threshold value corresponding to the detected the pressure $P(t)$ is compared with the calculated pressure gradient $\Delta P(t)$. Then, in the case where the comparison result indicates the pressure gradient $\Delta P(t)$ equal to or less than the pressure gradient component $\Delta P0$, the collision sensing device determines that she side collision that needs the operation of the occupant protecting device 20 has not occurred.

Specifically, the electronic control unit 10 as illustrated in a flowchart of FIG. 6 detects the pressure $P(t)$ in the space S with the pressure sensor 31 (step ST11). Then, the electronic control unit 10 removes noise from the detected signal (step ST12). The electronic control unit 10 calculates a pressure gradient $\Delta P(t)$ in the space S based on the pressure $P(t)$ after the noise removal (step ST13).

After that, the electronic control unit 10 compares a set of the pressure $P(t)$ and the pressure gradient $\Delta P(t)$ after the noise removal, with the collision determination map (step ST14). Then, the electronic control unit 10 determines whether or not the set of the pressure $P(t)$ and the pressure gradient $\Delta P(t)$ after the noise removal are plotted in the established collision determination region with increasing pressure $P(t)$. That is, the electronic control unit 10 determines whether or not the pressure gradient $\Delta P(t)$ on the curved line in the set with the pressure $P(t)$ becomes larger than the pressure gradient component $\Delta P0$, which is the determination threshold value corresponding to the pressure $P(t)$ with increasing pressure $P(t)$ (step ST15).

If the pressure gradient $\Delta P(t)$ becomes larger than the determination threshold value of the pressure gradient component $\Delta P0$, a collision condition is satisfied. The electronic control unit 10 consequently determines that a side collision that needs the operation of the occupant protecting device 20 has occurred (step ST16). Then, the curved line including a set of the pressure $P(t)$ and the pressure gradient $\Delta P(t)$ moves from the non-established collision determination region into the established collision determination region as illustrated by the solid line in FIG. 7. The electronic control unit 10 instructs the occupant protecting device 20 to operate based on the determination result (step ST17). Here, a side collision is employed as the example. Thus, the electronic control unit 10 activates the occupant protecting device 20 such as a side airbag and a curtain shield airbag that operates at the time of a side collision.

On the other hand, if the pressure gradient $\Delta P(t)$ is equal to or less than the pressure gradient component $\Delta P0$ of the determination threshold value, the electronic control unit 10 determines a side collision has not occurred (step ST18). At this time, the set of the pressure $P(t)$ and the pressure gradient $\Delta P(t)$ that has been used for the determination remains in the non-established collision determination region. The electronic control unit 10 in this case repeats these processing until the pressure $P(t)$ in the space S stops varying. As a result, if the determination result in step ST16 is obtained, the electronic control unit 10 makes the occupant protecting device 20 operate as described above. In contrast, if the determination result in step ST16 is not obtained, the curved line including the set of the pressure $P(t)$ and the pressure gradient $\Delta P(t)$ becomes a line illustrated by the alternate long and short dashed line or dashed line in FIG. 7. Thus, it is finally determined that a side collision has not occurred through step ST18. Thus, this avoids incorrect determination indicative of a side collision that needs the operation of the occupant protecting device 20. The curved line illustrated by the alternate long and short dashed line is a line obtained in the case where a bicycle or the like hits to cause a high pressure $P(t)$ and a low pressure gradient $\Delta P(t)$ in the space S. The curved line illustrated by the dashed line is a line obtained when the door 100 is hit with a bat, which causes a high pressure gradient $\Delta P(t)$ and a low pressure $P(t)$ in the space S.

As described above, the occupant protecting system 1 makes the collision determination based on the pressure $P(t)$ and the pressure gradient $\Delta P(t)$ in the space S at the door 100 next to the collided portion. At this time, the occupant protecting system 1 does not make a determination indicative of an occurrence of side collision that needs the operation of the occupant protecting device 20 unless the pressure gradient $\Delta P(t)$ is larger with lowering the pressure $P(t)$. This avoids activation of the occupant protecting device 20. Accordingly, the occupant protecting system 1 has improved determination accuracy of the collision determination. In the case where a side collision that needs the operation of the occupant protecting device 20 has actually occurred, a corresponding determination is made. In the case where an impact or a collided state that does not need the operation of the occupant protecting device 20 has occurred, it is determined that it is not a side collision that needs the operation of the occupant protecting device 20 has occurred. Further, the occupant protecting system 1 uses not only the pressure $P(t)$ but also the pressure gradient $\Delta P(t)$ in the space S. The occupant protecting system 1 makes a determination result at an earlier stage than using the pressure $P(t)$ alone. Thus, the occupant protecting system 1 promptly makes the occupant protecting device 20 operate as needed. The reason is that using the pressure $P(t)$ alone needs measurement of the maximum value, thus needing determination of the maximum value to provide a determination result. That is, the occupant protecting system 1 uses information of the pressure gradient $\Delta P(t)$ together with the pressure $P(t)$, thus providing the determination result without the maximum value of the pressure $P(t)$.

Here, the collision determination map in this example has the determination threshold value that restricts a determination indicative an occurrence of side collision that needs the operation of the occupant protecting device 20 unless the pressure gradient $\Delta P(t)$ is larger with lowering the pressure $P(t)$ in the space S. The determination threshold value is provided based on possible examples of impacts, thus being effective on the collision determination. However, in the collision determination map, the exemplary impact with the high pressure $P(t)$ and the low pressure gradient $\Delta P(t)$ (illustrated by the alternate long and short dashed line) may provide a force that causes a higher pressure $P(t)$ than the pressure $P(t)$ illustrated by the curved line (the alternate long and two short dashes line in FIG. 8) in FIG. 7. In this case, the curved line may be partially plotted in the established collision determination region, thus causing a possibility of an incorrect determination. In view of this, the collision determination map is preferred to be prepared, for example, as illustrated in FIG. 8 considering this case.

The determination threshold value in FIG. 8 is set using an inclined line similar to that in FIG. 7. The determination threshold value is set also using a tangent line in the pressure axis direction at the maximum pressure gradient $\Delta P(t)$ of the curved line illustrated by the alternate long and short dashed line, or a line shifted in the increasing direction of the pressure gradient in parallel with respect to this tangent line. With the collision determination map in FIG. 8, even in the case where the exemplary collision illustrated by the alternate long and short dashed line provides the force that causes the higher pressure $P(t)$ than that in the exemplary curved line (the curved line of the alternate long and two short dashes line in FIG. 8) in FIG. 7, the curved line of this exemplary collision is plotted in the non-established collision determination region. This avoids the incorrect determination.

Figure 9:
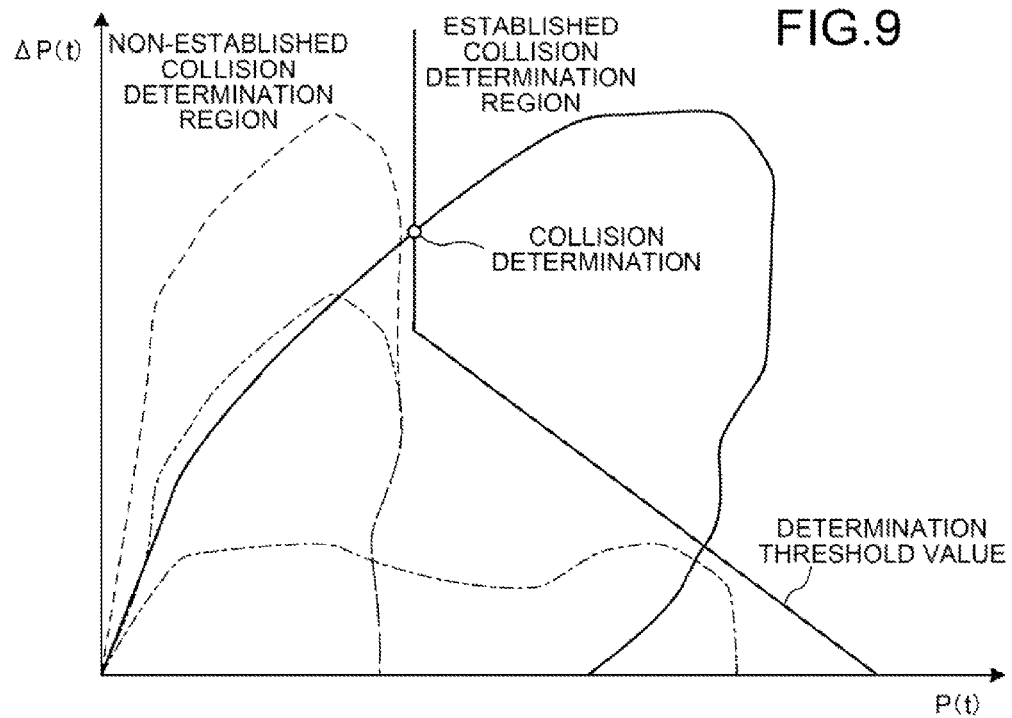
FIG. 9 is a graph illustrating another exemplary collision determination map.

In the collision determination map of FIG. 7, an exemplary impact (illustrated by the dashed line) with a high pressure gradient $\Delta P(t)$ and a low pressure $P(t)$ may provide a force that causes a higher pressure gradient $\Delta P(t)$ than that of the curved line (illustrated by the alternate long and two short dashes line in FIG. 9). In this case, the curved line may be partially plotted in the established collision determination region, thus causing an incorrect determination. Therefore, the collision determination map is preferred to be set, for example, as illustrated in FIG. 9 considering this case.

The determination threshold value in FIG. 9 is set using an inclined line similar to that in FIG. 7. The determination threshold value is set also using a tangent line in the pressure gradient axis direction at the maximum pressure $P(t)$ of the curved line illustrated by the dashed line, or a line shifted in the increasing direction of the pressure in parallel with respect to this tangent line. With the collision determination map in FIG. 9, even in the case where the exemplary collision illustrated by the dashed line provides the force that causes the higher pressure gradient $\Delta P(t)$ than that in the exemplary curved line (the curved line of the alternate long and two snort dashes line in FIG. 9) in FIG. 7, the curved line of this exemplary collision is plotted in the non-established collision determination region. This avoids the incorrect determination.

Figure 10:
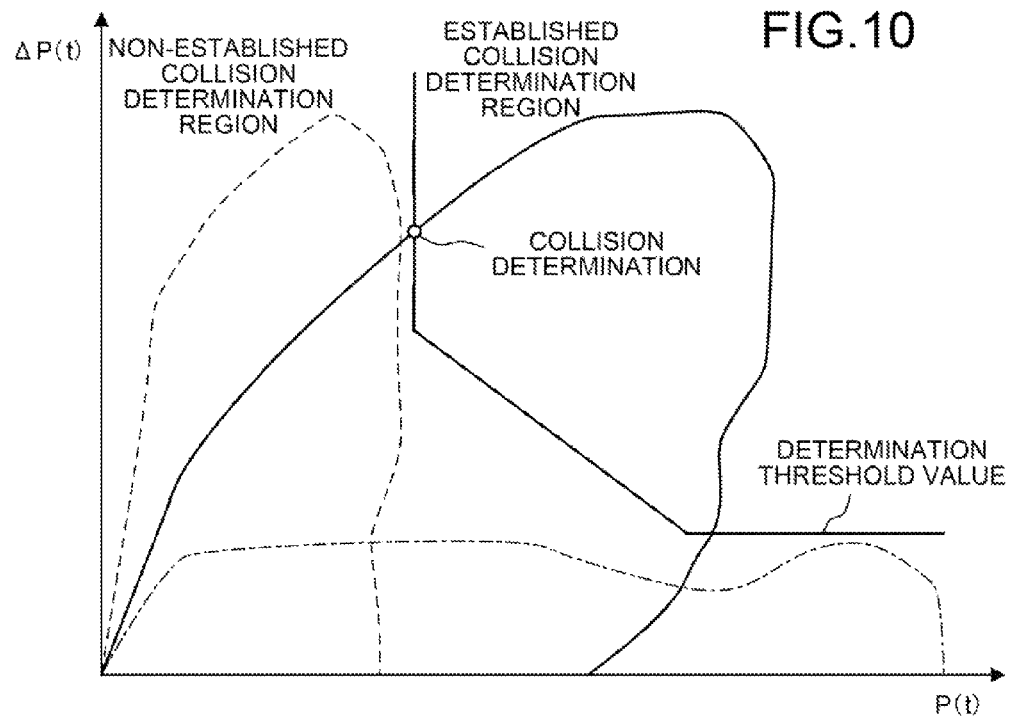
FIG. 10 is a graph illustrating another exemplary collision determination map.

Further, the collision determination map may foe formed as illustrated in FIG. 10. A determination threshold value in FIG. 10 is set using an inclined line similar to that in FIG. 7. The determination threshold value is set also using a tangent line in the pressure axis direction at the maximum pressure gradient $\Delta P(t)$ of the curved line of an exemplary impact illustrated by the alternate long and short dashed line, or a line shifted in the increasing direction of the pressure gradient in parallel with respect to this tangent line. The determination threshold value is set also using a tangent line in the pressure gradient axis direction at the maximum pressure $P(t)$ of the curved line of this exemplary impact illustrated by the dashed line, or a line shifted in the increasing direction of the pressure in parallel with respect to this tangent line. With the collision determination map in FIG. 10, even in the case where the exemplary collision illustrated by the alternate long and short dashed line provides the force that causes the higher pressure $P(t)$ than that in the curved line of the alternate long and short dashed line in FIG. 7, the curved line of this exemplary collision is plotted in the non-established collision determination region. This avoids the incorrect determination. Further, with the collision determination map in FIG. 10, even in the case where the exemplary collision illustrated by the dashed line provides the force that causes the higher gradient $\Delta P(t)$ than that in the curved line of dashed line in FIG. 7, the curved line of this exemplary collision is plotted in the non-established collision determination region. This avoids the incorrect determination in this case.

Further, the collision determination map may be formed as illustrated in FIG. 11. A determination threshold value in FIG. 11 is set using a tangent line in the pressure gradient axis direction at the maximum pressure $P(t)$ of a curved line (a dashed line) illustrating an exemplary impact with a high pressure gradient $\Delta P(t)$ and a low pressure $P(t)$, or a line shifted in the increasing direction of the pressure in parallel with respect to this tangent line. The determination threshold value is set also using a tangent line in the pressure axis direction at the maximum pressure gradient $\Delta P(t)$ of a curved line (a alternate long and short dashed line) illustrating an exemplary impact with a high pressure $P(t)$ and a low pressure gradient $\Delta P(t)$, or a line shifted in the increasing direction of the pressure gradient in parallel with respect to this tangent line. The determination threshold value allows a more prompt determination that a collision has occurred than a determination with the determination threshold value of collision determination map in FIG. 7, depending on an exemplary curved line (an output) that does not allow determination of collision. Further, this avoids the incorrect determination, similarly to the collision determination map in FIG. 10.

The collision sensing device may make the final collision determination based on the determination results that includes the above-described collision determination based on the pressure $P(t)$ and the pressure gradient $\Delta P(t)$ in the space S, along with the collision determination based on acceleration G (lateral, acceleration Gy and anteroposterior acceleration Ga) of the vehicle body. That is, the collision sensing device may make the final determination indicative of the occurrence of collision that needs the operation of the occupant protecting device 20 if the following two determinations are both made. The two determinations include: the collision determination indicative of the occurrence of collision that needs the operation of the occupant protecting device 20 based on the pressure $P(t)$ and the pressure gradient $\Delta P$; and the collision determination indicative of the occurrence of collision that needs the operation of the occupant protecting device 20 based on the acceleration G. For example, as illustrated in FIG. 12, the curved line (the solid line) of the collision that needs the operation of the occupant protecting device 20 may be similar to the curved line (the alternate long and short dashed line) of the collision that does not need the operation of the occupant protecting device 20. At this time, the following determinations may be made depending on the set determination threshold value. The collision that needs the operation, of the occupant protecting device 20 is incorrectly determined that the operation is not needed. The collision that does not need the operation of the occupant protecting device 20 is incorrectly determined that the operation is needed. Sensing the pressure P(t) and the pressure gradient ΔP(t) in the space S alone as described above might not avoid these incorrect determinations.

Figure 13:
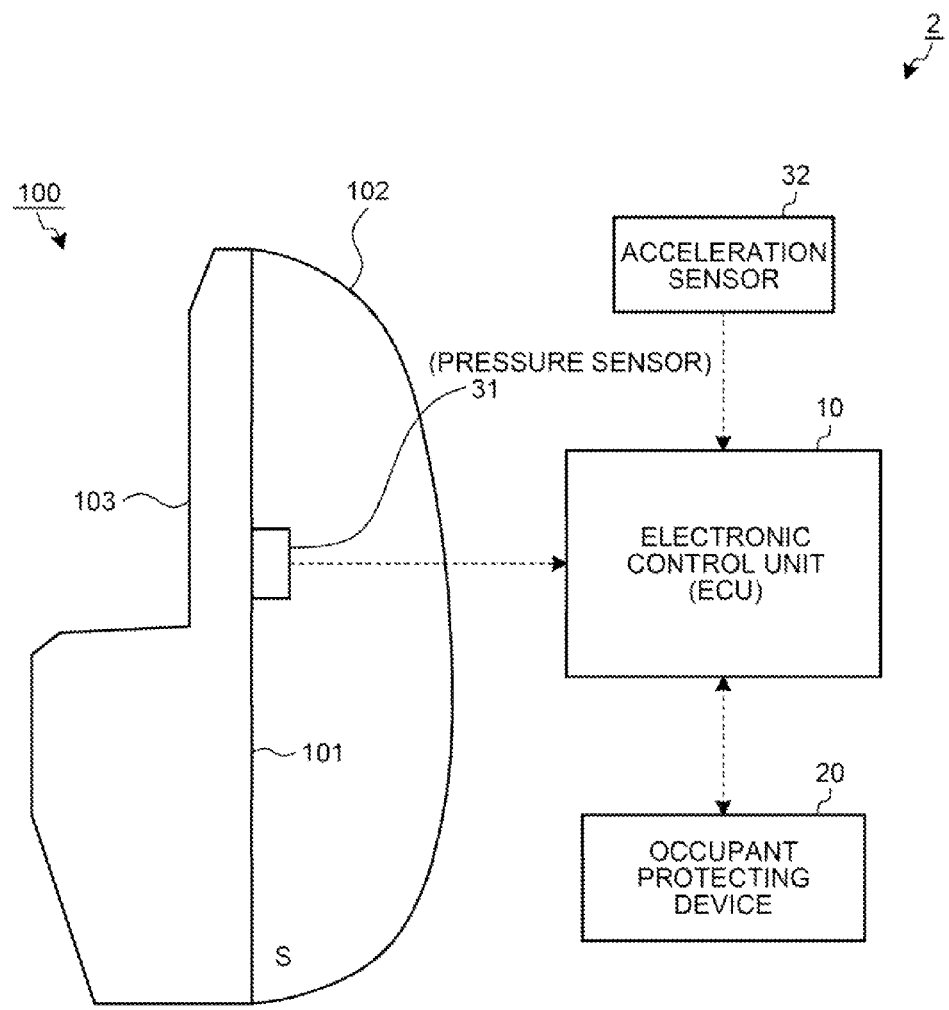
FIG. 13 is a block diagram illustrating other exemplary configurations of the collision sensing device and the occupant protecting system according to the present invention.

The reference numeral 2 in FIG. 13 denotes an occupant protecting system in this example. After making the final determination, the occupant protecting system 2 makes the occupant protecting device 20 operate, while the occupant protecting system 2 does not make the occupant protecting device 20 operate in the case where the occupant protecting system 2 determines at least one of the collision determinations to be a collision that does not need the operation of the occupant protecting device 20.

The occupant protecting system 2 includes an acceleration sensor 32 at a point that is resistant to deformation due to a side collision, which includes a floor panel, a floor tunnel, a chassis of the electronic control unit 10, or the like. The portion that is resistant to deformation is a point of a part where some deformations might occur while an acceleration component due to the deformations does not occur (that is, a part that restricts the acceleration sensor 32 from outputting any acceleration component due to the deformations) in the case where a side face of a vehicle body undergoes an external force such as an impact (hitting by a ball or the like) and collision. This point also includes a point that does not undergo any deformation at this time. More specifically, the portion that is resistant to deformation is the point where change in acceleration due to a collision occurs while change in acceleration due to an impact does not occur or does not easily occur although the portion undergoes the acceleration due to the impact. Thus, the acceleration sensor 32 that is disposed in this point detects larger change in acceleration due to a collision compared with due to an impact. Similarly, a side collision will be described here as an example. The acceleration sensor 32 is used to determine a side collision, thus detecting a lateral acceleration Gy of the vehicle body. The electronic control unit 10 compares the lateral acceleration Gy, which is based on a detection signal of the acceleration sensor 32, with a predetermined threshold value Gy0. In the case where the lateral acceleration Gy is larger than the threshold value Gy0, the electronic control unit 10 determines that a collision that needs the operation of the occupant protecting device 20 has occurred. That is, the threshold value Gy0 is a collision condition for acceleration to determine a collision using the lateral acceleration Gy. Thus, the collision condition to determine a collision using the pressure P(t) and the collision condition to determine a collision using the pressure gradient ΔP(t) are defined as collision conditions for pressure. Vehicle behavior stabilizing control or the like may use an acceleration sensor to detect a lateral acceleration. In the case where this acceleration sensor is already disposed in a part that is resistant to deformation due to a side collision, this detection signal of the acceleration sensor may be used.

Specifically, an operation of the occupant protecting system 2 will be described based on a flowchart in FIG. 14.

The electronic control unit 10 executes collision determination based on the pressure P(t) and the pressure gradient ΔP(t) in the space S (step ST21). The determination is as described above.

The electronic control unit 10 determines whether or not the determination result of the collision determination indicates a side collision that needs the operation of the occupant protecting device 20 based on the pressure P(t) and the pressure gradient ΔP(t) (step ST22). Here, in the case where the determination result indicates that it is not the side collision that needs the operation of the occupant protecting device 20, the electronic control unit 10 once terminates this processing. Then, the electronic control unit 10 repeats the same processing. On the other hand, the determination result indicates the side collision that needs the operation of the occupant protecting device 20, the electronic control unit 10 executes a collision determination based on the acceleration G (the lateral acceleration Gy) (step ST23).

Figure 15:
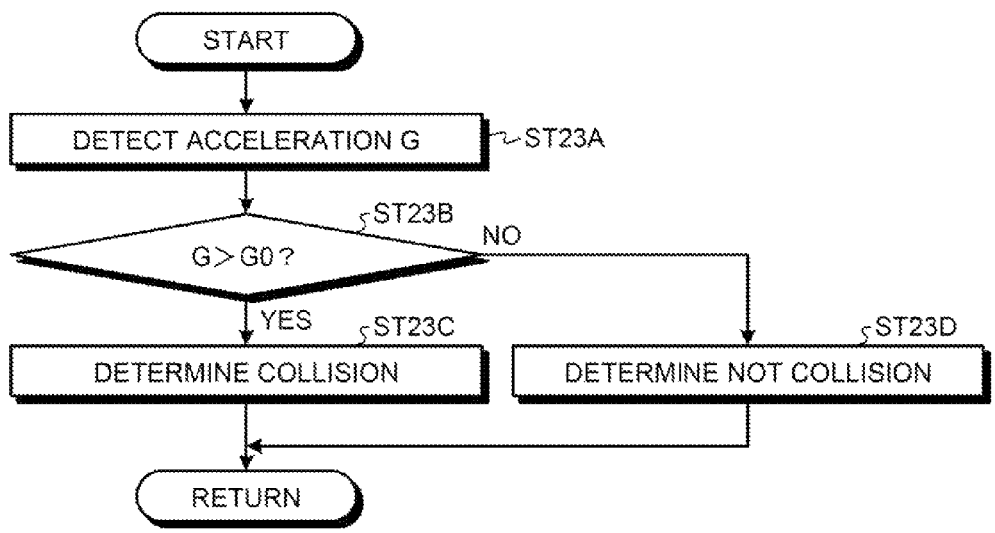
FIG. 15 is a flowchart illustrating a collision determination operation of the collision sensing device and the occupant protecting system illustrated in FIG. 13 based on acceleration.

The collision determination based on the acceleration G (the lateral acceleration Gy) is illustrated in a flowchart of FIG. 15. The collision determination starts with detection of the acceleration G (the lateral acceleration Gy) using the electronic control unit 10 (step ST23A). The electronic control unit 10 determines whether or not the acceleration G (the lateral acceleration Gy) is larger than a predetermined threshold value G0 (Gy0) (step ST23B).

Figure 16:
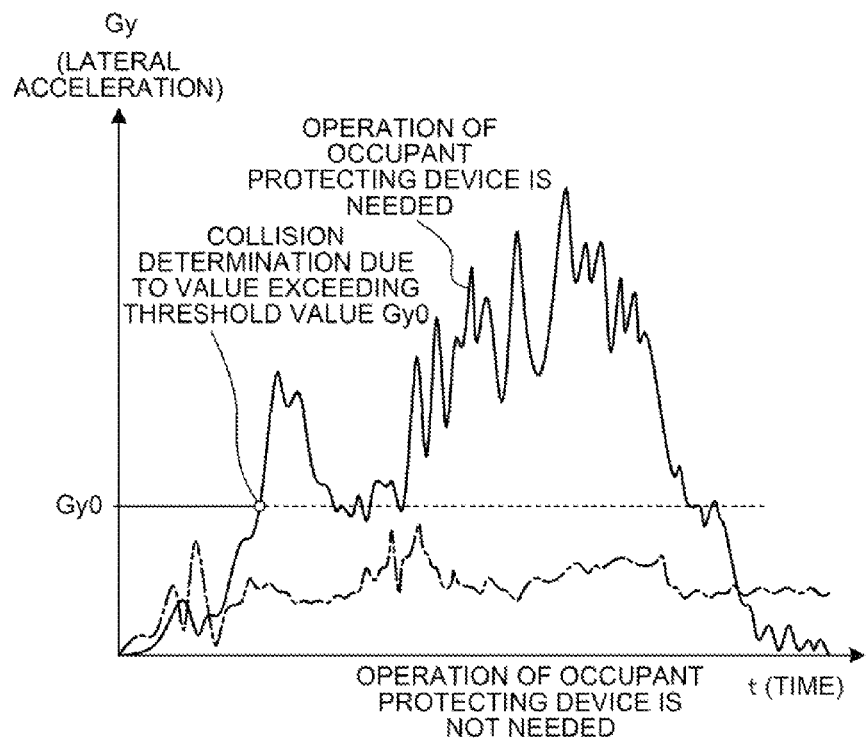
FIG. 16 is a graph illustrating lateral acceleration Gy and a threshold value Gy0 at the time of a side collision that needs the operation of the occupant protecting device.

In the case where the acceleration G (the lateral acceleration Gy) changes due to the collision that needs the operation of the occupant protecting device 20, the acceleration G (the lateral acceleration Gy) increases as time goes on and eventually reduces as illustrated by the solid line in FIG. 16. When such a side collision has occurred, the increasing lateral acceleration Gy exceeds the threshold value Gy0 as illustrated in FIG. 16. Accordingly, in the case where the electronic control unit 10 determines that the acceleration G (the lateral acceleration Gy) is larger than the threshold value G0 (Gy0), the electronic control unit 10 determines that a side collision that needs the operation of the occupant protecting device 20 has occurred (step ST23C). The electronic control unit 10 uses the determination result for the above-described determination in step ST24.

Figure 17:
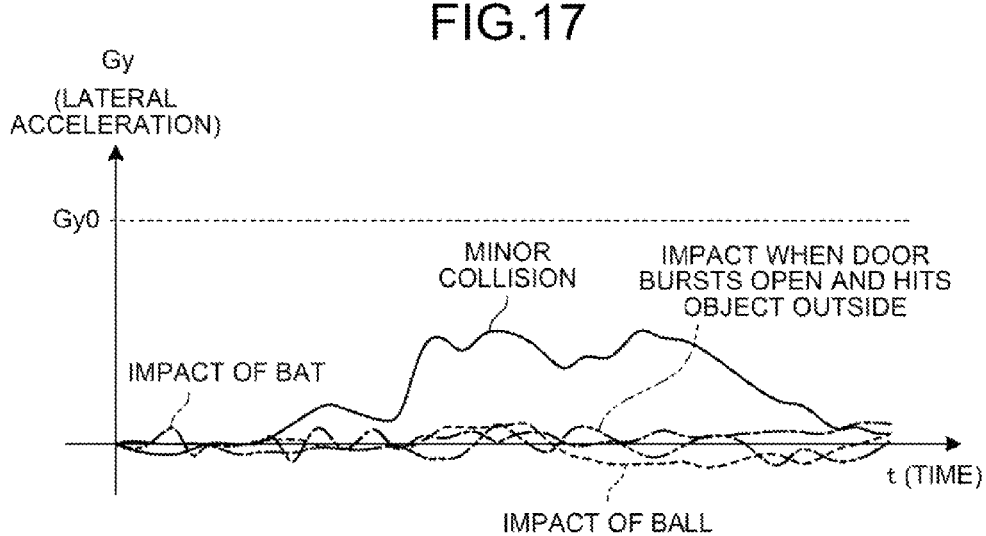
FIG. 17 is a graph illustrating lateral acceleration Gy and a threshold value Gy0 at the time of a side collision that does not need the operation of the occupant protecting device.

On the other hand, the acceleration sensor 32 is disposed in a part that is resistant to deformation due to a side collision. In this case, the acceleration G (the lateral acceleration Gy) detected with the acceleration sensor 32 changes less than that when a side collision that needs the operation of the occupant protecting device 20 occurs as illustrated in FIG. 17, in the case where the outer panel 102 may undergo a force other than a side collision that needs the operation of the occupant protecting device 20 has occurred, or a rapid change in air pressure may occur outside. Then, the acceleration G (the lateral acceleration Gy) changes little depending on conditions. Alternate long and short dashed line in FIG. 16 illustrates an exemplary case. Accordingly, the threshold value G0 (Gy0) is set considering values of the acceleration G (the lateral acceleration Gy) obtained from a test result of the side-impact test described above. The threshold value G0 (Gy0) is set to a larger value than those obtained from the curved lines in these cases. In the case where the electronic control unit 10 determines that the acceleration G (the lateral acceleration Gy) does not exceed the threshold value G0 (Gy0), the electronic control unit 10 determines that a collision that needs the operation of the occupant protecting device 20 has not occurred (step ST23D). The electronic control unit 10 uses the determination result for the above-described determination in step ST24. FIG. 17 exemplarily illustrates a minor collision such as a collision of a bicycle with the outer panel 102, an impact of a ball that hits the outer panel 102, an impact of a bat that hits the outer panel 102, and an impact of the outer panel 102 when the door 100 bursts open and hits an object outside.

The electronic control unit 10 determines whether or not the determination result of the collision determination based on the acceleration G (the lateral acceleration Gy) indicates a side collision that needs the operation of the occupant protecting device 20 (step ST24). Here, in the case where the determination result indicates that it is not a side collision that needs the operation of the occupant protecting device 20, the electronic control unit 10 once terminates this processing. Then, the electronic control unit 10 repeats the same processing. On the other hand, in the case where the determination result indicates a side collision that needs the operation of the occupant protecting device 20, the electronic control unit 10 makes the final determination indicative of an occurrence of side collision that needs the operation of the occupant protecting device 20 (step ST25). The electronic control unit 10 makes the occupant protecting device 20 (for example, a side airbag) operate based on the final determination (step ST26).

Figure 14:
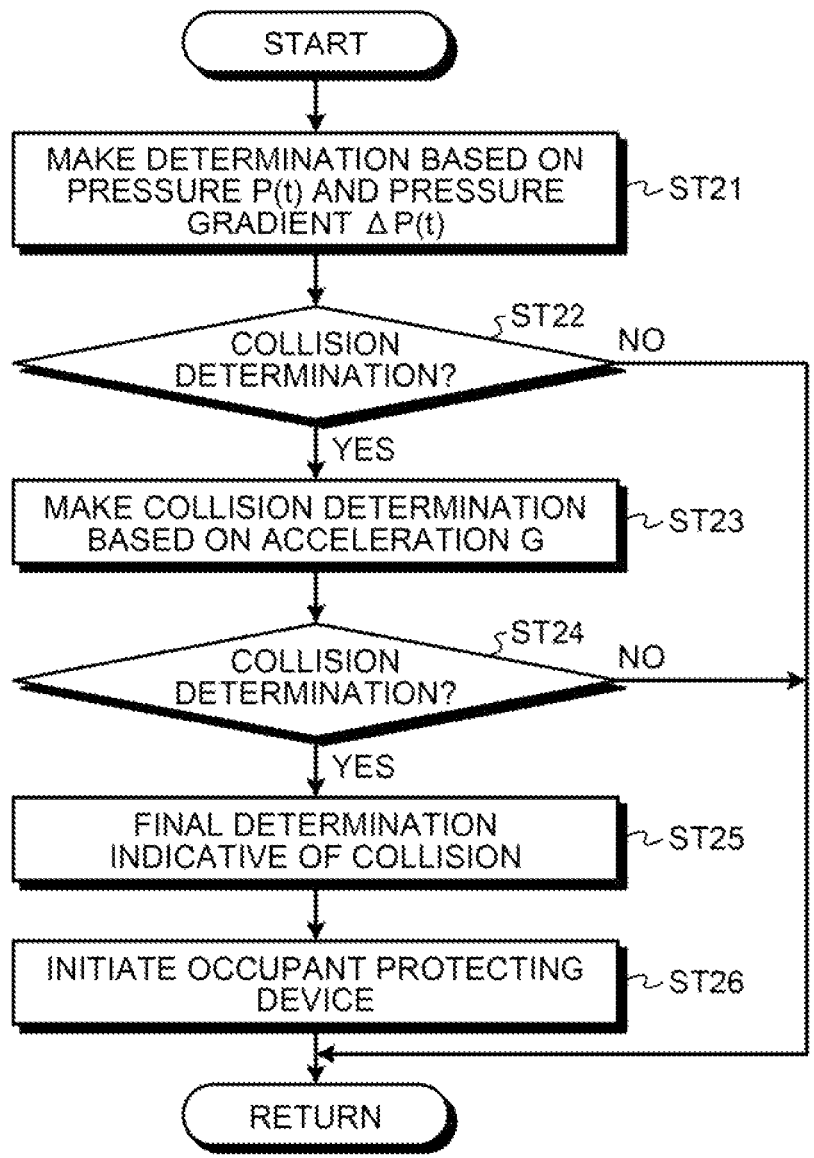
FIG. 14 is a flowchart illustrating whole operations of the collision sensing device and the occupant protecting system illustrated in FIG. 13.

Here, according to FIG. 14, the collision determination based on the pressure P(t) and the pressure gradient ΔP(t) is performed and then the collision determination based on the acceleration G (the lateral acceleration Gy) is performed. However, in the occupant protecting system 2, the sequences may be changed or the respective determinations may be performed in parallel at the same time.

As described above, the occupant protecting system 2 makes the collision determination based on: the pressure P(t) and the pressure gradient ΔP(t) in the space S of the door 100 next to the collided portion; and the lateral acceleration Gy of the vehicle body. Then, in the case where the occupant protecting system 2 determines that a side collision that needs the operation of the occupant protecting device 20 has occurred in both the collision determinations, the occupant protecting system 2 makes the final determination indicative of an actual occurrence of such a side collision, thus making the occupant protecting device 20 operate. On the other hand, the occupant protecting system 2 determines that a side collision that needs the operation of the occupant protecting device 20 has not occurred in at least one of the determinations, the occupant protecting system 2 does not make the occupant protecting device 20 operate. Accordingly, the occupant protecting system 2 further improves determination accuracy of the collision determination compared with the examples described above. In the case where a side collision that needs the operation of the occupant protecting device 20 has actually occurred, determination regarding this collision is made. In the case where an impact or an exemplary collision that does not need the operation of the occupant protecting device 20 has occurred, the determination indicative of a side collision that needs the operation of the occupant protecting device 20 has not occurred is made.

Thus, the occupant protecting systems 1 and 2 avoids the operation of the occupant protecting device 20 based on an incorrect determination, with the improved determination accuracy of the collision determination. This reduces time and cost for maintenance of the occupant protecting device 20, that is, for replacement of the deployed airbag, supplying explosives, and the like.

The examples described above explain a side collision, thus having described the space S of the door 100. The occupant protecting systems 1 and 2 may be applicable to a frontal collision and a rear end collision insofar as the space S is disposed in a front bumper, a rear bumper, or a vehicle body portion that includes both of the bumpers. In contrast, the occupant protecting system 2 includes an acceleration sensor, which detects anteroposterior acceleration Ga, disposed at a portion that is resistant to deformation due to the frontal collision or the rear end collision. In this case, the occupant protecting device 20 is an airbag mounted in a steering wheel or the like.

While in the examples described above, the space S is formed of the vehicle exterior member and the vehicle interior member, the space S may be formed of one of them.

The occupant protecting systems 1 and 2 may be applied to determination of operation of a seat belt with a pretensioner mechanism (the occupant protecting device) that instantaneously roils up a seat belt at the time of a collision, which improves a restraint effect.

INDUSTRIAL APPLICABILITY

As described above, the collision sensing device and the occupant protecting system according to the present invention is effective for a technique that improves determination accuracy of a collision.

REFERENCE SIGNS LIST

1, 2 OCCUPANT PROTECTING SYSTEM
10 ELECTRONIC CONTROL UNIT
20 OCCUPANT PROTECTING DEVICE
32 PRESSURE SENSOR
32 ACCELERATION SENSOR
101 INNER PANEL
102 OUTER PANEL
S SPACE

The invention claimed is:

1. A collision sensing device, comprising:
a pressure sensor configured to detect a pressure in a space, the space being disposed close to an inner side of an exterior member of a vehicle, wherein
the collision sensing device obtains a change per unit time of the pressure based on the pressure detected by the pressure sensor, and determines an occurrence of collision in a case where the change per unit time of the pressure is larger than a change per unit time of pressure as a threshold value, the threshold value corresponding to the pressure detected by the pressure sensor, and
the threshold value is set to restrict the determination indicative of the occurrence of collision unless the change per unit time of the pressure is larger with lowering the pressure, the change per unit time of the pressure being obtained from the pressure.

2. The collision sensing device according to claim 1, wherein the pressure is a denoised signal after detecting with the pressure sensor.

3. The collision sensing device according to claim 1, further comprising:
an acceleration sensor configured to detect an acceleration of a vehicle body, wherein
the collision sensing device determines a final determination indicative of an actual occurrence of collision in a case where a determination indicative of an occurrence of collision is made based on the pressure and the change per unit time of the pressure, and a determination indicative of an occurrence of collision is made based on the acceleration, the change per unit time of the pressure being obtained from the pressure.

4. The collision sensing device according to claim 2, further comprising:
an acceleration sensor configured to detect an acceleration of a vehicle body, wherein
the collision sensing device determines a final determination indicative of an actual occurrence of collision in a case where a determination indicative of an occurrence of collision is made based on the pressure and the change per unit time of the pressure, and a determination indicative of an occurrence of collision is made based on the acceleration, the change per unit time of the pressure being obtained from the pressure.

5. An occupant protecting system, comprising:
a pressure sensor configured to detect a pressure in a space, the space being disposed close to an inner side of an exterior member of a vehicle; and
an occupant protecting device configured to protect an occupant inside a cabin, wherein
the occupant protecting system obtains a change per unit time of the pressure based on the pressure detected by the pressure sensor, and determines an occurrence of collision in a case where the change per unit time of the pressure is larger than a change per unit time of pressure as a threshold value, the threshold value corresponding to the pressure detected by the pressure sensor, so as to make the occupant protecting device operate, and
the threshold value is set to restrict the determination indicative of the occurrence of collision unless the change per unit time of the pressure is larger with lowering the pressure, the change per unit time of the pressure being obtained from the pressure.

6. The occupant protecting system according to claim 5, further comprising:
an acceleration sensor configured to detect an acceleration of a vehicle body, wherein
the occupant protecting system determines a final determination indicative of an actual occurrence of collision in a case where a determination indicative of an occurrence of collision is made based on the pressure and the change per unit time of the pressure, and a determination indicative of an occurrence of collision is made based on the acceleration, the change per unit time of the pressure being obtained from the pressure, so as to make the occupant protecting device operate.

7. The occupant protecting system according to claim 5, wherein
the pressure is a denoised signal after detecting with the pressure sensor.

8. The occupant protecting system according to claim 6, wherein
the pressure is a denoised signal after detecting with the pressure sensor.

9. An occupant protecting system, comprising:
a pressure sensor configured to detect a pressure in a space, the space being disposed close to an inner side of an exterior member of a vehicle; and
an occupant protecting device configured to protect an occupant inside a cabin, wherein
the occupant protecting system obtains a change per unit time of the pressure based on the pressure detected by the pressure sensor, and makes the occupant protecting device operate in a case where the change per unit time of the pressure is larger than a change per unit time of pressure as a threshold value, the threshold value corresponding to the pressure detected by the pressure sensor, and
the occupant protecting system restricts the occupant protecting device from operating unless the change per unit time of the pressure is larger with lowering the pressure, the change per unit time of the pressure being obtained from the pressure.

10. The occupant protecting system according to claim 9, further comprising:
an acceleration sensor configured to detect an acceleration of a vehicle body, wherein
the occupant protecting system makes the occupant protecting device operate in a case where the change per unit time of the pressure is larger than the threshold value corresponding to the pressure detected by the pressure sensor, and the acceleration satisfies a collision condition for acceleration, the change per unit time of the pressure being obtained from the pressure.

11. The occupant protecting system according to claim 9, wherein
the pressure is a denoised signal after detecting with the pressure sensor.

12. The occupant protecting system according to claim 10, wherein
the pressure is a denoised signal after detecting with the pressure sensor.

* * * * *